US006901164B2

United States Patent
Sheffer

(10) Patent No.: US 6,901,164 B2
(45) Date of Patent: May 31, 2005

(54) METHOD FOR AUTOMATED HIGH SPEED IMPROVEMENT OF DIGITAL COLOR IMAGES

(75) Inventor: Moredechai Sheffer, Haifa (IL)

(73) Assignee: Trusight Ltd., Misgav (IL)

( * ) Notice: Subject to any disclaimer, the term of this patent is extended or adjusted under 35 U.S.C. 154(b) by 598 days.

(21) Appl. No.: 09/829,960

(22) Filed: Apr. 11, 2001

(65) Prior Publication Data

US 2001/0041004 A1 Nov. 15, 2001

Related U.S. Application Data

(60) Provisional application No. 60/199,116, filed on Apr. 24, 2000, and provisional application No. 60/197,371, filed on Apr. 14, 2000.

(51) Int. Cl.[7] .................................................. G06K 9/00
(52) U.S. Cl. ...................... 382/167; 382/274; 358/461; 358/521
(58) Field of Search ............................... 382/162, 166, 382/167, 232, 237, 251–254, 260, 274, 298, 299; 345/555; 358/426.01, 426.14, 426.16, 461, 521; 708/203; 250/216, 368, 584–586

(56) References Cited

U.S. PATENT DOCUMENTS 4,384,336 A * 5/1983 Frankle et al. .............. 382/302
5,309,526 A * 5/1994 Pappas et al. .............. 382/237
5,418,895 A * 5/1995 Lee ............................ 345/604
5,909,244 A * 6/1999 Waxman et al. .......... 348/222.1
5,991,456 A * 11/1999 Rahman et al. ............. 382/254
6,101,273 A * 8/2000 Matama ...................... 382/169
6,674,544 B2 * 1/2004 Shiota et al. ................ 358/1.9

OTHER PUBLICATIONS

W. Blohm, "Lightness Determination at Curved Surfaces with Applications to Dynamic Range Compression and Model–Based Coding of Facial Images," IEEE Tranc. Image Processing, vol. 6, no. 8, Aug. 1997, pp. 1129–1138.*

* cited by examiner

Primary Examiner—Bhavesh M. Mehta
Assistant Examiner—Yubin Hung
(74) Attorney, Agent, or Firm—Mark M. Friedman

(57) ABSTRACT

An automated method of improving digital color images at high speed, which supports pipe-lining and has very little memory requirements, and is therefore specially suitable for on-the-fly processing of real time video, as well as for processing of large batches of images without the need of human intervention. The method includes a novel dynamic range adaptation scheme that operates on the norm of the image, which is suitable as is for gray-scale images. For, color images, a simple color reconstruction stage is added that maintains optimal color fidelity.

12 Claims, 3 Drawing Sheets

SYSTEM 100

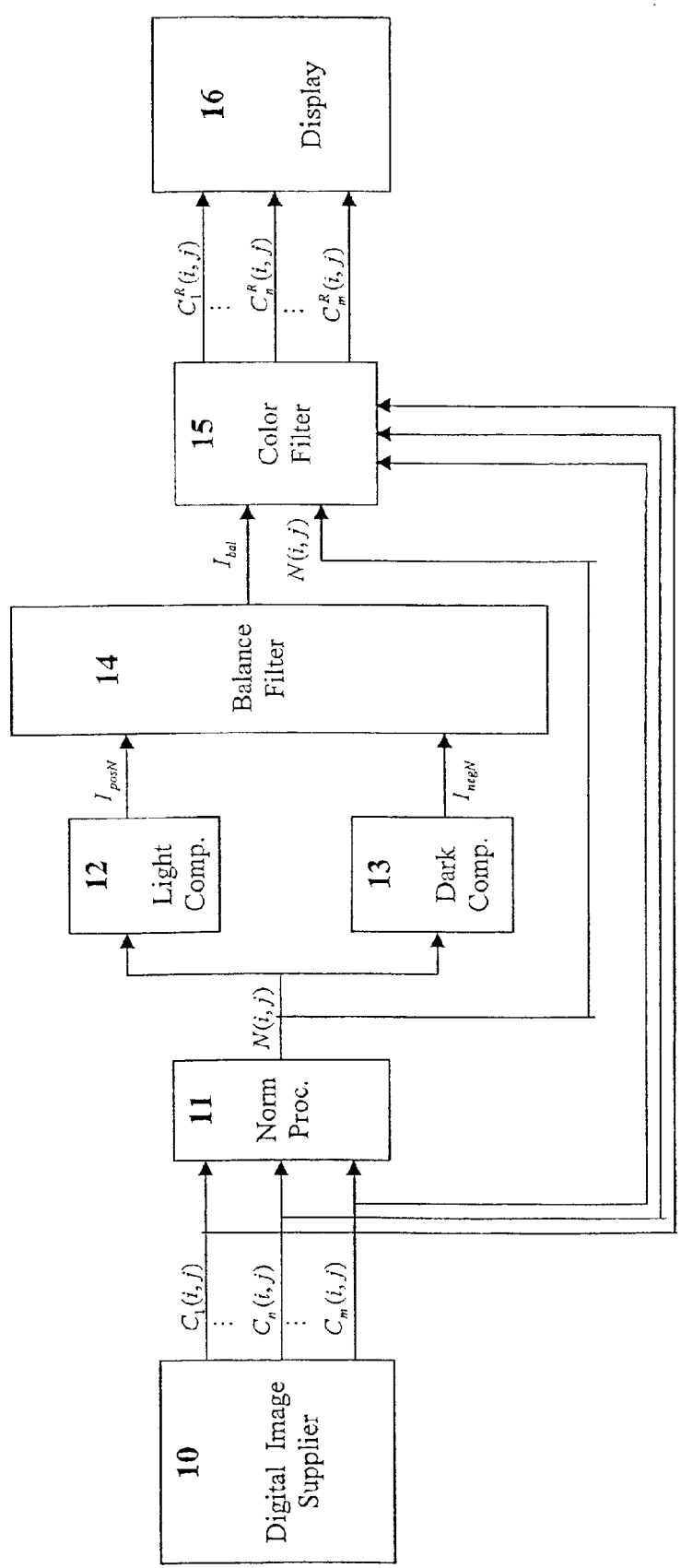
Figure 1 - SYSTEM 100

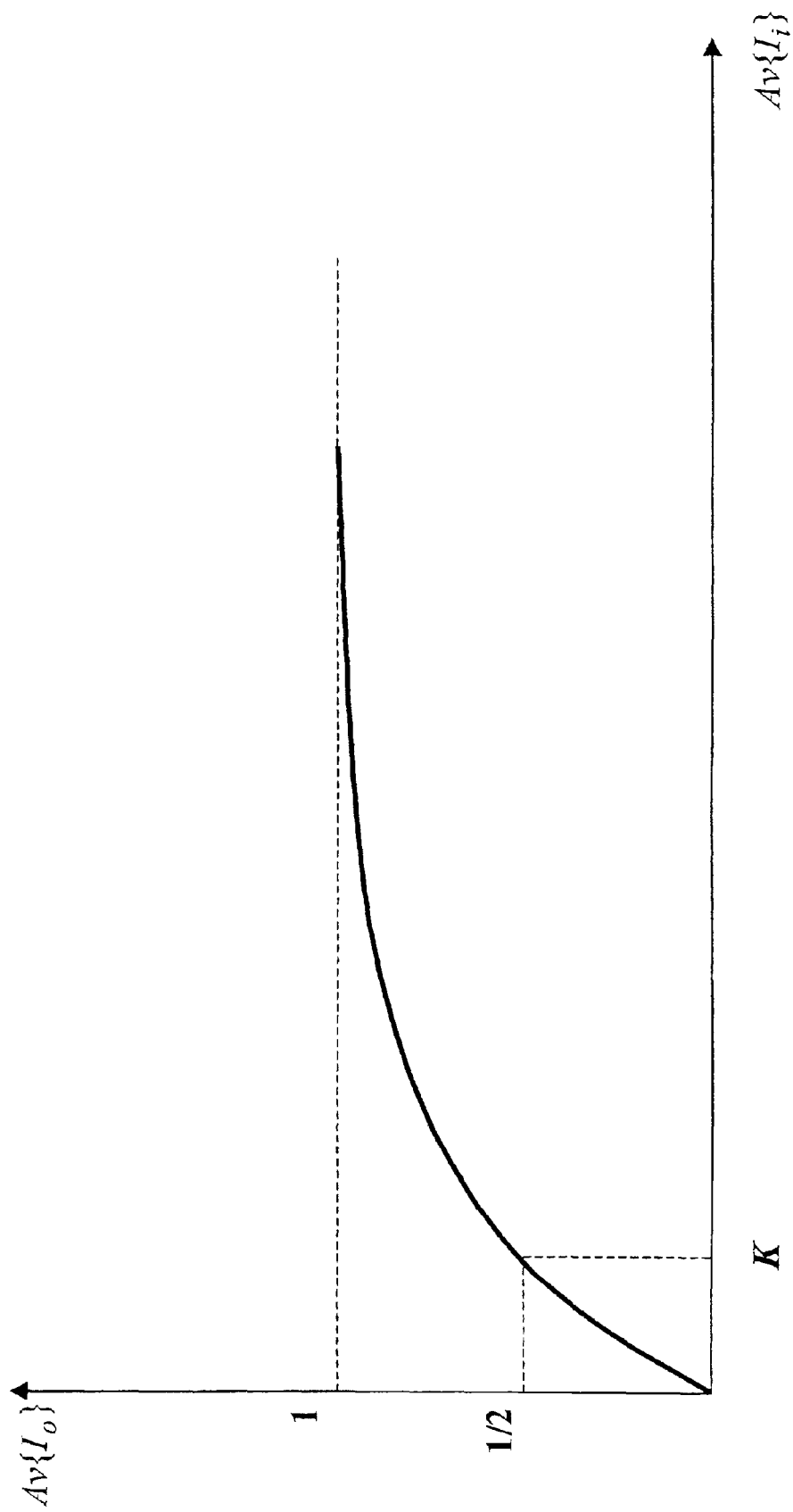
Figure 2 - Weber's Law

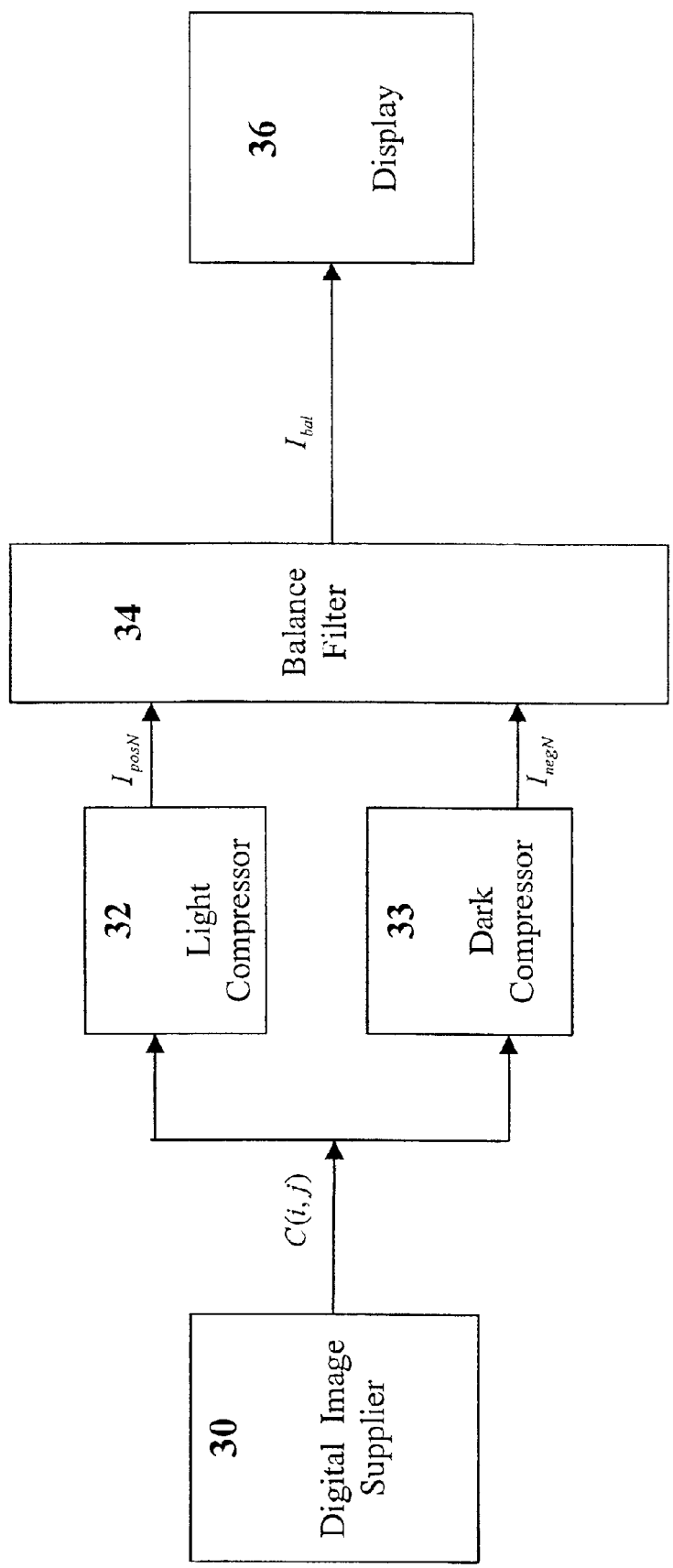
Figure 3 - SYSTEM 300

METHOD FOR AUTOMATED HIGH SPEED IMPROVEMENT OF DIGITAL COLOR IMAGES

CROSS REFERENCE TO PRIOR APPLICATIONS

This application claims priority from U.S. Provisional Applications No. 60/197,371 filed Apr. 14, 2000, and No. 60/199,116 filed Apr. 26, 2000.

FIELD AND BACKGROUND OF THE INVENTION

The present invention relates generally to image processing, and more specifically to high speed image enhancement by dynamic range adaptation and normalization and high fidelity color reconstruction.

The three major factors that define image quality are: 1) dynamic range (DR), which is the number of distinct intensity levels in each spectral band that is needed in order to carry all the image data; 2) color fidelity, which is how close the reconstructed image colors are to the true life scenery colors; and 3) resolution, which is the smallest observable (to a viewer) detail in the image.

The DR of a display, e.g. of paper sheets and electronic screens, is the number of intensity levels perceived by the eye on the display. Due to a well-known psychophysical limitation, the DR of common displays is smaller than the DR of most photographed images. As a result, many details are not accessible to our eyes and simply get lost when a photograph is displayed on a screen or printed on paper. Thus, dynamic range compression or adaptation is needed in order for the viewer to be able to actually see all the data that is in the image.

The DR in natural scenarios can exceed $10^{10}$. The DR of the neural channel from the human eye to the brain is physically constrained to less than 1000. Thus, it has been conjectured by researchers that dynamic range compression (DRC), which is using less intensity levels to carry more data, must take place somewhere between the eye photoreceptors and the neural communication channel input.

Continuous research on the human, as well as on animal visual systems has been conducted since the mid $19^{th}$ century. Numerous models have been suggested to explain the outstanding ability of biological eyes to adapt to tremendous dynamic ranges of luminance. Many researchers agree that the DR adaptation of biological eyes is performed in a neural network located just beneath the photoreceptors in the retina. (Dowling, J. E. et al., "The interplexiform cell: a new type of retinal neuron," Invest. Opthalmol. Vol. 15, pp. 916–926, 1976. )

The two most remarkable phenomena associated with the retina are: 1) the apparent unlimited range of DRC ratios that the eye is capable of exploiting, which is modeled by the Michaelis Eqn., also known as the Weber's Law (Hemila S., "Background adaptation in the rods of the frog's retina," J. Physiol., Vol. 265, pp. 721–741) and 2), the relation between the spatial acuity, i.e., the effective spatial resolution of the eye, and the average luminance level of the scenery.

It has been discovered (Van Nes, F. L. et al., "Spatial modulation transfer in the human eye," J. Opt. Soc. Am., Vol. 57, pp. 401–406, 1967; and Westheimer, G., "Visual acuity and spatial modulation thresholds," Chap. 7 in *Handbook of Sensory Phys.*, Vol. VII/4, pp. 170–187, Springer Verlag, 1972) that the effective resolution of the eye is monotonically increasing as a part of the adaptation to increasing levels of luminance.

A spatial feedback automatic gain control (AGC) model has been suggested and investigated by Shefer (Shefer M., "AGC Models for Retinal Signal Processing", M.Sc.Thesis, The Technion—Israel Institute of Technology, November 1979.)

This model simultaneously explains several important properties of the spatio-temporal response of the eye. In particular, it explains how both Weber's Law and the spatial frequency response shift with luminance, are generated as a part of a simple unified model.

The AGC model realization for DRC has been suggested in patents by Shefer (Israel Patent No. 109824, U.S. Pat. No. 5,850,357) and by Zeevi et al. (Canadian Patent No.1.318.971). Zeevi suggests an implicit recursive realization that takes time to converge to a sufficiently accurate solution. This recursive algorithm is clearly inferior to closed form algorithms that compute the desired result explicitly and non-recursively based on the known input only.

In his patents, Shefer suggested a closed-form solution for the AGC model. However, such a closed-form solution is only attainable for a uni-dimensional case. Hence, applying it to image processing implies that it should process the rows and the columns of the image separately and sequentially. This again is a time and memory consuming method that does not fit either real-time processing of video, or processing of large batches of images.

In U.S. Pat. No. 5,991,456, Z. Rahman et al. propose a Homomorphic configuration based filter for combined improvement of DRC, color constancy and lightness rendition aspects. This combined treatment of all three aspects together creates a three-way coupling that makes it difficult to optimize each aspect separately. Hence, the final result must be some compromise between the three aspects. Also, the Rahman filter does not exhibit a Weber Law behavior, nor does it have the adaptive resolution property that comes along with it, unlike AGC-based solutions. As a result, the Rahman filter response, although logarithmic in nature, presents a rather limited range of DRC ratios along with a rather constant resolution, which combination does not resemble the human eye operation. Hence, the result cannot look as natural as it otherwise would.

Other disadvantages of the Rahman filter are the fact that each spectral band has to repeatedly undergo the whole filtering process quite a large number of times, each time with a different size of the convolution neighborhood. This results in a very computational-intensive and time consuming routine, that makes the color reconstruction process cumbersome and difficult to optimize. Rahman's exponentially decaying neighborhoods also require added computation time and memory. This logic makes the Rahman filter unfit for real-time processing of video and fast processing of large batches of images.

In general, all DRC algorithms in the prior art that exhibit either a logarithmic or a Weber law type of response behavior, suffer from a common disadvantage: the DRC is only applied to the light areas of the image, resulting in more data being revealed in the darker areas of the image. Consequently, the visibility improvement in lighter areas may be insufficient.

There is thus a widely recognized need for, and it would be highly advantageous to have, an automated method of improving digital color images at high speed and for supporting pipe-lining, a method that has very little memory requirements.

SUMMARY OF THE INVENTION

It is an object of the present invention to provide an automated method for real-time improvement of digital video, and for high speed improvement of large batches of digital images for both color and gray-scale cases.

Another object of the present invention is to provide a high speed automated method for improving a digital image, where the method follows the human eye behavior and obeys Weber's Law in terms of self dynamic range compression, yet enables dynamic range adaptation across all ranges of intensities. In particular, the method should allow dynamic range adaptation in the bright and mid ranges, and not be limited only to the dark range.

A yet another object of the present invention is to provide a high speed automated method for improving a digital image, the method following the human eye behavior in terms of self-adapted improved resolution according to scene lighting conditions.

A yet another object of the present invention is to provide a high speed automated method for improving a digital image in terms of color fidelity across all ranges of intensities, and across an entire scene, thus overcoming the color rendition problem mentioned in the prior art.

A yet another object of the present invention is to provide an automated high speed method of improving digital video and large batches of images, so that their appearance is as close as possible to that perceived by human vision, particularly in the aspects of dynamic range adaptation, improved self-adapted resolution and color fidelity, for all kinds and levels of lighting, and across an entire scene.

According to the present invention there is provided a high-speed digital enhancement method for singled color images, comprising: a) computing a normalized light dynamic range compressed image; b) computing a normalized dark dynamic range compressed image; and c) computing a balanced dynamic range compressed image, using the normalized light and dark DRC images.

BRIEF DESCRIPTION OF THE DRAWINGS

The invention is herein described, by way of example only, with reference to the accompanying drawings, wherein:

FIG. 1 is a schematic view of a way to carry out a first embodiment of the present invention where a color image can be improved in terms of automatic self adaptation of both dynamic range and spatial resolution, as well as in terms of high fidelity color reconstruction.

FIG. 2 is the average transmission according to Weber's Law and the Michaelis Eqn.

FIG. 3 is a schematic view of a way to carry out a second embodiment of the present invention where a gray-scale image can be improved in terms of automatic self adaptation of both dynamic range and spatial resolution.

DESCRIPTION OF THE PREFERRED EMBODIMENTS

The present invention is of a method for automated high speed improvement of digital color images. Specifically, the method of the present invention can be used to support pipe-lining, and requires very little memory, hence being especially suitable for on-the-fly processing of real time video, as well as for processing of large batches of images without the need of human intervention. The method of the present invention includes a novel dynamic range compression process that operates on the Euclidean norm of the image, and is suitable as is for gray-scale images. For color images, a simple color reconstruction stage is added, a stage that maintains optimal color fidelity.

The principles and operation of the method for automated high speed improvement of digital color images according to the present invention may be better understood with reference to the drawings and the accompanying description.

Referring now to the drawings, and in particular to FIG. 1, a system 100 is shown to carry out a first embodiment of the method of the present invention. This embodiment is used by way of example to demonstrate the image improvement in terms of self adaptation of dynamic range and spatial resolution, as well as in terms of high fidelity color reconstruction, as they are related to color images. It is to be understood that the present method can be easily reduced to gray-scale images, as further explained in detail below. System 100 consists of a digital image supplier 10 such as a camera, a DVD player, a hard disk, etc., that is capable of outputting a sequence of digital color images or frames. Each one of the frames is represented by a set of matrices of similar size: $C_1(i,j)$, $C_2(i,j)$, ... $C_n(i,j)$, ... $C_m(i,j)$, where $C_n(i,j)$ is the intensity value of the image in the nth color component, at the pixel whose coordinates on a display 16, e.g., a monitor or a printer, are row i and column j. In the case where said sequence of frames is part of a video movie, it is a common practice to supply each frame as a time sequence of pixels data, going first over the first row starting with its first column and ending with its last column, then repeating this process for the second row, etc., until the last column of the last row is reached.

With the exception of the typically 3×3 surround functions utilized by the present method, as detailed below, all computations are done on a pixel-by-pixel basis, without the need to memorize or study larger parts of the frames, as done by some other methods. This implies that the effective net delay of the present invention is a single TV line with a memory requirement of two lines only. The minimum delay and memory properties enable easy and natural support for processing of video "on-the-fly", hence representing a great advantage of the present method over other DRC methods.

Referring still to FIG. 1, the norm N of an image is computed in a processor 11 according to:

$$N(i, j) = \left[\sum_{n=1}^{m} C_n^2(i, j)\right]^{\frac{1}{2}} \quad (1)$$

It is readily seen from Eqn. (1) that for a gray-scale image, i.e., when m=1, and the source image is simply $C_1(i,j) \equiv C(i,j)$, Eqn. (1) is reduced to $N(i,j) \equiv C(i,j)$, i.e. the norm of a gray-scale image is the image itself. The DRC process according to FIG. 1 is further advanced by feeding the norm $N(i,j)$ into a Light DRC processor 12 and a Dark DRC processor 13.

The advantage of taking the norm in the case of a color image is that in this case, the dynamic range of the source norm can be larger than that of each color component separately by a factor up to $\sqrt{m}$, where m is the total number of orthogonal color components that are used. For example, in the case of the common RGB triple, the effective dynamic range increase can reach $\sqrt{3}$.

However, the norm of a color image is in itself a gray-scale image, so that except for a color filter 15 in FIG. 1, the rest of the DRC process for a color image, represented by blocks 12, 13 and a balance filter 14, is identical with the process for a gray-scale image, as described in detail in the following.

In order for the following steps of the present invention to be understood, a pixel-by-pixel division of two images of similar size, say A divided by B, is now defined as:

$$D(i, j) \equiv \frac{A}{B}(i, j) = \frac{A(i, j)}{B(i, j)}.$$

That is, the result of the division is a matrix D whose size equals the size of A and B, and in which the intensity value of the (i,j) pixel is given by the quotient of the value of the (i,j) pixel of A divided by the value of the (i,j) pixel of B. Similarly, we define a pixel-by-pixel product of A and B as: $E(i,j) \equiv AB(i,j) = A(i,j) \cdot B(i,j)$. In addition, we define a sum of a scalar and a matrix as the result of an addition of the scalar to each one of the matrix entries. We also define a product of a scalar and a matrix as the result of a multiplication of the scalar by each one of the matrix entries.

The light dynamic range compressed image is computed in processor 12 of FIG. 1 according to:

$$I_{pos}(i, j) = \frac{N(i, j)}{K + W * \{N(i, j)\}} \quad (2)$$

where K is a positive scalar variable, and $W*\{N(i,j)\}$ denotes a linear discrete convolution operator that operates on the norm $N(i,j)$ with averaging kernels of typically, but not limited to, 3×3 neighborhoods. The kernels' coefficients are symmetrical in the two axes with respect to the central pixel coefficient. For example, for host-based processing applications the kernel $$\frac{1}{9}\begin{bmatrix} 1 & 1 & 1 \\ 1 & 1 & 1 \\ 1 & 1 & 1 \end{bmatrix}$$

may be used, where the division by the sum of the coefficients normalizes the kernel to unity. For Fixed Point DSP applications the kernel $$\frac{1}{4}\begin{bmatrix} 0.25 & 0.5 & 0.25 \\ 0.5 & 1 & 0.5 \\ 0.25 & 0.5 & 0.25 \end{bmatrix}$$

may be used.

Eqn. (2) is the preferred DRC embodiment of the present invention. It is a heuristic filter specially devised to follow the most important properties of the human eye, namely dynamic range compression according to Weber's Law, and the self-adaptive resolution to the average luminance.

Referring now to FIG. 2, it expresses Weber's Law and the Michaelis Eqn., $$Av\{I_0\} = \frac{Av\{I_i\}}{K + Av\{I_i\}}$$

where the horizontal axis is the average of the input image: $Av\{I_1\}$, the vertical axis is the average of the output image $Av\{I_0\}$, and K is a scalar parameter. Weber's Law gives the output image average in terms of the input image average. The fact that Weber's Law is met by Eqn. (2) is obvious, since $W*\{N(i,j)\}$ is an average of $N(i,j)$, and thus $W*\{N(i,j)\}$ becomes the input variable of the Michalis Eqn. and one can write:

$$([I_{pos}(i, j)])_{av} = \frac{([N(i, j)])_{av}}{K + ([N(i, j)])_{av}} \quad (2')$$

where the subscript av denotes "average of". Therefore, when $[N(i,j)]_{av}$ assumes high values so that K becomes negligible, the average of the output $I_{pos}(i,j)$ $([I_{pos}(i,j)]_{av})$ approaches unity.

Also, for $[N(i,j)]_{av} = K$, we have $$[I_{pos}(i, j)]_{av}(K) = \frac{1}{2}.$$

This point is called "The Knee-Point of the DRC Curve," the slope of the Weber's Law curve (see FIG. 2) approaches zero as $[N(i,j)]_{av}$ becomes bigger and bigger than K and it approaches 1/K as $[N(i,j)]_{av}$ becomes smaller and smaller relative to K.

In other words—there is practically no compression before the average intensity of the input image becomes comparable in magnitude to the value of K.

Denoting the dynamic range of $[N(i,j)]_{av}$ by FS (the full-scale value of the average source image), and assuming FS>>K, it is reasonable in light of the above to define the dynamic range compression ratio DRCR as the ratio of the full-scale value to the knee-point value. That is:

$$DRCR \equiv \frac{FS}{K}.$$

With this definition one can recognize that for any given K, the compression ratio only depends on FS, which is unlimited, whereas for any given FS, the compression ratio is inversely proportional to K. Accordingly, in the present invention K is used as a control variable that conveniently enables the user to change the compression ratio at will.

However, Weber's Law in itself cannot fully explain the behavior of the human eye. The missing part is the progressively improved acuity as the average luminance of the input image is being increased, or the self-adaptive resolution property mentioned above. This property of Eqn. (2) can be conjectured by analogy to the solution of the uni-dimensional AGC by Shefer (M. Sc. Thesis, the Technion, see above) which has shown that when $[N(i,j)]_{av}$ takes on progressively larger values, the spatial frequency response characteristic of the present DRC filter of Eqn. (2) exhibits a transition from Low Pass filter to Band Pass filter, whith the upper cut-off frequency of the latter being given by:

$$f_{c/o}(DRC) = f_{c/o}(W)\sqrt{1 + \frac{([N(i, j)]_{av}}{K}} \quad (2'')$$

where $f_{c/o}(W)$ is the cut-off frequency of the convolution operator W. This implies that the spatial resolution of the present DRC filter is both self-adaptive to the average luminance of the source image, and at the same time can be easily adjusted by the control variable K.

One can appreciate the fact that both the dynamic range compression ratio, and the spatial resolution of the present DRC filter, are self-adapted by monotonically increasing with the average luminance of the source image. This happens both locally for different areas of a single scenery, and globally, i.e. from one scenery to another. This property is very similar to the behavior of the human eye as known from scientific research. Other dynamic range compression methods such as Homomorphic filters do not exhibit such resemblance to the human eye.

A dark DRC image is computed in processor 13 of FIG. 1. The dark DRC image provides complementary characteristics to the light DRC image, that will compensate for possible loss of contrast in the lighter areas of the light DRC image. The dark DRC image is computed according to $$I_{neg}(i,j) = 1 - \frac{FS - N(i,j)}{K + W*\{FS - N(i,j)\}} = 1 - \frac{FS - N(i,j)}{K + FS - W*N(i,j)} \quad (3)$$

where FS is the full scale value, which is the dynamic range of the source image. For example, FS=256 for 8 bit images, FS=1024 for 10 bit images, etc.

$I_{neg}(i,j)$ is thus obtained by operating with the basic DRC filter of Eq. 2 on the so-called "negative", which is a non-negative mirror FS-N(i,j) of the norm with respect to the line N(i,j)=FS/2, then taking the mirror image of the DRC result with respect to half unity. This causes the graph of the average of the dark DRC image versus the average of the source image to look as a double-mirror image of the Weber's Law graph of FIG. 2, once with respect to the line $Av\{I_i\}$=FS/2 and again with respect to the line $Av\{I_o\}$=1/2, thereby causing the compression to operate mainly in the darker areas of the scenery, hence revealing more data in the lighter areas and complementing the light DRC image.

Referring still to blocks 12 and 13 of FIG. 1, the dynamic ranges of $I_{pos}(i,j)$ and $I_{neg}(i,j)$ are normalized and truncated in order to match the display dynamic range, and to eliminate artifacts that can be generated in the DRC filters due to illegal outputs. This is done by defining permitted, or legal maximum and minimum values for $I_{pos}(i,j)$ and $I_{neg}(i,j)$ by $Max_p(I_{pos})$, $Max_p(I_{neg})$, $Min_p(I_{pos})$, and $Min_p(I_{neg})$, and then stretching and shifting the intensity levels of both images to have: $Max_p(I_{pos})$ and $Max_p(I_{neg}) \rightarrow FS_d$, and $Min_p(I_{pos})$ and $Min_p(I_{neg}) \rightarrow 0$, where $FS_d$ is the display full scale value, i.e., 255 for 8 bits display, etc.

The maximum and minimum permitted values are:

$$Max_p(I_{pos}) = \frac{FS}{K + FS}$$

$$Min_p(I_{neg}) = FS - \frac{FS}{K + FS}$$

This implies that the normalization of $I_{pos}$ is given by $$I_{posN} = \frac{FS_d(K + FS)}{FS} \cdot I_{pos} \quad (4)$$

where $I_{posN}$ should be truncated above $FS_d$, i.e., if $(I_{posN} \geq FS_d)$, then $(I_{posN} \rightarrow FS_d)$
The computation and truncation of Eqn. (4) is executed in processor 12 of FIG. 1.

By a similar logic, the normalization of $I_{neg}$ is given by $$I_{negN} = \frac{(FS+K)}{FS} \cdot \left(I_{neg} - FS + \frac{FS}{K+FS}\right) \cdot FS_d \quad (5)$$

Denoting:

$$Neg(i,j) \equiv \frac{FS - N(i,j)}{K + FS - W*N(i,j)},$$

Eqn. (5) can be further simplified to $$I_{negN}(i,j) = FS_d \left[1 - \frac{Neg(i,j) \cdot (K+FS)}{FS}\right] \quad (6)$$

where $I_{NegN}$ should be truncated below 0, i.e., if $(I_{negN} \leq 0)$, then$(I_{negN} \rightarrow)$. The computation and truncation of Eqn. (6) is further executed in processor 13 of FIG. 1.

Eqns. (2), (3), (4), (5) and (6) obey Weber's Law They also exhibit the property of self-adaptive spatial resolution. In these Eqns, both the average DRC ratio DRCR, and the cut-off frequency $f_{c/o}(DRC)$, are controlled by the constant K.

The final dynamic range and spatial resolution adapted image, which is a linear combination of the light and dark DRC normalized images, is now computed in the balance filter 14 of FIG. 1 according to:

$$I_{bal}(i,j) = x \cdot I_{posN}(i,j) + (1-x) \cdot I_{negN}(i,j) \quad (7)$$

in which x can be varied by the user between 0 and 1. By varying the value of x, one can control the distribution of both the dynamic range compression ratio (DRCR) and the spatial resolution (affected by $f_{c/o}(DRC)$ ), over the entire intensity scale of the image. This is a unique property of the present invention, not found in the prior art.

Denoting the nth reconstructed spectral band by $C_n^R(i,j)$, the color reconstruction of the present invention is done by color filter 15 (FIG. 1) according to:

$$C_n^R(i,j) = C_n(i,j) \frac{I_{bal}(i,j)}{N(i,j)} \quad (8)$$

where the quotient $$\frac{I_{bal}(i,j)}{N(i,j)}$$

varies from pixel to pixel, but is a constant for all the color components that belong to the same pixel. Thus the present color reconstruction method strictly preserves the color proportions of the source image, hence achieving high color fidelity. The reconstructed color components of the present method are finally fed to a display 16.

Referring now to FIG. 3, a system 300 is shown to carry out a second embodiment of the present invention, which is related to gray-scale images. This embodiment is obtained from the embodiment of FIG. 1 by way of reduction, where norm processor 11 and color filter 15 of FIG. 1 are both omitted. Then, for this gray-scale embodiment, a gray-scale image C(i,j) is inputted from a gray-scale Digital Image Supplier 30 directly into light and dark compressors 32 and 33, identical in way of operation and function with processors 12 and 13 respectively, of FIG. 1. The outputs of these processors are fed into a balance filter 34, whose function and operation is identical with that of filter 14 of FIG. 1. The gray-scale image $I_{bal}(i,j)$ at the output of filter 34 is improved in terms of dynamic range and spatial resolution adaptation. This image is fed into a display 36 to be further displayed as a gray-scale image.

Another preferred embodiment for color images is to apply a gray-scale processor like system 300 of FIG. 3 to each one of the single color bands separately (e.g., to each one of the R, G, and B sequences of frames), and then feed the three dynamic range compressed outputs to a compatible (e.g., RGB) input of a display that supports this standard (e.g., a common VGA monitor). The advantage of this embodiment is a considerable saving in processing time, since the three DRC processors can operate simultaneously, while color filter 15 in FIG. 1, which is a large time resource consumer, is altogether removed in this embodiment.

Other Embodiments

The DRC filter computation can be done in three different ways. The first way is to realize the arithmetic operations of Eqn. (2). The second way does without the time-consuming division operation. This is done by using a division lookup table (LUT) whose input is K+W*{N(i,j)} and whose output is $$\frac{1}{K + W*\{N(i, j)\}},$$

and
then further multiplying, pixel-by-pixel, the LUT output by N(i,j). The division LUT has to be reloaded anew each time the value of K is changed. The third way is to remove both the division and the multiplication by N(i,j) operations. This is done by replacing the whole filter arithmetics with a two-dimensional input LUT, whose inputs are N(i,j) and K+W*{N(i,j)}, and whose output is $$\frac{N(i, j)}{K + W*\{N(i, j)\}}.$$

This two-dimensional input LUT also has to be reloaded anew each time the value of K is changed.

In order to save the time-consuming division by N(i,j) in Eqn. (8), it is possible to replace it by the use of a division LUT whose input is N(i,j) and whose output is $$\frac{1}{N(i, j)},$$

that further multiplies, pixel-by-pixel, $C_n(i,j)I_{bal}(i,j)$. Additional time-saving can be gained by computing $C_n^R(i,j)$ of Eqn. (8) using a two-dimensional input LUT whose inputs are $I_{bal}(i,j)$ and N(i,j), and whose output is $$\frac{I_{bal}(i, j)}{N(i, j)},$$

an output that further multiplies $C_n(i,j)$ pixel-by-pixel.

Still other ways to save on computation time in the color reconstruction include replacing the square and square root operations of Eqn. (1) by LUTs. For example, the computation of $X^2$ performed by the multiplication X·X is replaced by a LUT whose input is X and whose output is $X^2$. Similarly, the computation of $X^{1/2}$, which is usually done via a time-consuming computation of a power series, is replaced by a LUT whose input is X and whose output is $X^{1/2}$.

While the invention has been described with respect to a limited number of embodiments, it will be appreciated that many variations, modifications and other applications of the invention may be made.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to this application.

What is claimed is:

1. A high-speed digital enhancement method for gray-scale images, comprising:

a. computing a normalized light dynamic range compressed image;

b. computing a normalized dark dynamic range compressed image; and c. computing a balanced dynamic range compressed image, using said normalized light and dark dynamic range compressed images;

wherein said step of computing a normalized light dynamic range compression image further includes computing a light dynamic range compressed image as $$I_{pos}(i, j) = \frac{N(i, j)}{K + (W*N)(i, j)}$$

wherein $I_{pos}(i,j)$ represents said light dynamic range compressed image, N(i,j) represents one of the gray-scale images, K is a positive scalar variable, W is an averaging kernel and * represents convolution.

2. The method of claim 1, where the computation of said light and dark normalized dynamic range compressed images includes using look-up tables.

3. A method for dynamic range compression and color reconstruction of a color image, the image having a plurality of original colors and a single original norm, the method comprising:

a. obtaining a balanced dynamic range compressed norm of the image;

b. dividing said balanced dynamic range compressed norm by the original norm; and c. reconstructing each color by multiplying each original color by a quotient of said balanced dynamic range compressed norm divided by the original norm.

4. The method of claim 3, wherein said step of reconstructing includes using a two dimensional lookup table (LUT) of $$\frac{I_{bal}(i, j)}{N(i, j)}.$$

5. The method of claim 3, wherein said step of reconstructing includes using a uni-dimensional lookup table (LUT) of $$\frac{1}{N(i, j)}.$$

6. A method of enhancing an input image, comprising the steps of:

(a) computing a norm N(i,j) of each pixel of the input image; and (b) computing a light dynamic range compressed image, each pixel whereof is $$I_{pos}(i, j) = \frac{N(i, j)}{K + (W * N)(i, j)}$$

wherein K is a positive scalar variable, W is an averaging kernel, N is a matrix of said norms in a neighborhood of said each pixel and * represents convolution.

7. The method of claim 6, wherein said light dynamic range compressed image is computed using a lookup table for $$\frac{1}{K + (W * N)(i, j)}.$$

8. The method of claim 6, wherein said light dynamic range compressed image is computed using a lookup table for $$\frac{N(i, j)}{K + (W * N)(i, j)}.$$

9. The method of claim 6, further comprising the step of:

(c) computing a dark dynamic range compressed image, each pixel whereof is $$I_{neg}(i, j) = 1 - \frac{(FS - N)(i, j)}{K + (W * (FS - N))(i, j)}$$

wherein FS is a full-scale dynamic range matrix, K is a positive scalar variable, W is an averaging kernel, (FS−N) is a matrix of a difference between FS and said norms in a neighborhood of said each pixel, and * represents convolution.

10. The method of claim 9, further comprising the step of:

(d) normalizing and truncating said light dynamic range compressed image, thereby producing a normalized light dynamic range compressed image; and (e) normalizing and truncating said dark dynamic range compressed image, thereby producing a normalized dark dynamic range compressed image.

11. The method of claim 10, further comprising the step of:

(f) combining said normalized light dynamic range compressed image and said normalized dark dynamic range compressed image to produce a balance dynamic range compressed image.

12. A high-speed digital enhancement method for gray-scale images, comprising:

a. computing a normalized light dynamic range compressed image, b. computing a normalized dark dynamic range compressed image; and c. computing a balanced dynamic range compressed image, using said normalized light and dark dynamic range compressed images;

wherein said step of computing a normalized dark dynamic range compressed image further includes computing a dark dynamic range compressed image as $$I_{neg}(i, j) = 1 - \frac{(FS - N)(i, j)}{K + (W * (FS - N))(i, j)}$$

wherein $I_{neg}(i,j)$ represents said dark dynamic range compressed image, N(i,j) represents one of the gray-scale images, FS is a matrix, identical in dimension to N, that represents a dynamic range of said one gray-scale image; K is a positive scalar variable, W is an averaging kernel and * represents convolution.

* * * * *